United States Patent
Carnelli et al.

(10) Patent No.: US 9,067,806 B2
(45) Date of Patent: Jun. 30, 2015

(54) PROCESS FOR THE PURIFICATION OF AN AQUEOUS STREAM COMING FROM THE FISCHER-TROPSCH REACTION

(75) Inventors: Lino Carnelli, Carbonate (IT); Lino Locatelli, Vigevano (IT)

(73) Assignee: ENI S.p.A., Rome (IT)

( * ) Notice: Subject to any disclaimer, the term of this patent is extended or adjusted under 35 U.S.C. 154(b) by 1003 days.

(21) Appl. No.: 13/147,119

(22) PCT Filed: Jan. 28, 2010
(Under 37 CFR 1.47)

(86) PCT No.: PCT/EP2010/000569
§ 371 (c)(1),
(2), (4) Date: Mar. 29, 2013

(87) PCT Pub. No.: WO2010/086182
PCT Pub. Date: Aug. 5, 2010

(65) Prior Publication Data
US 2013/0299334 A1  Nov. 14, 2013

(30) Foreign Application Priority Data

Jan. 30, 2009 (IT) .................. MI09A0117

(51) Int. Cl.
*C02F 1/04* (2006.01)
*C02F 1/66* (2006.01)
C02F 9/00 (2006.01)
(Continued)

(52) U.S. Cl.
CPC . *C02F 1/04* (2013.01); *C02F 1/048* (2013.01); *C02F 1/441* (2013.01); *C02F 1/66* (2013.01);
(Continued)

(58) Field of Classification Search
CPC .............. C02F 1/441; C02F 1/66; C02F 3/02; C02F 3/286; C02F 2101/32; C02F 2103/36
USPC ........... 203/10, 11, 14–19, 36–38, 88–91, 96, 203/99; 518/705, 711, 723, 726, 727, 728
See application file for complete search history.

(56) References Cited

U.S. PATENT DOCUMENTS 6,462,097 B1   10/2002  Martino et al.
7,323,497 B2 *  1/2008  Abbott et al. ................. 518/700
(Continued)

FOREIGN PATENT DOCUMENTS

JP   58 118538   7/1983
JP   60 112742   6/1985
(Continued)

OTHER PUBLICATIONS

International Search Report Issued May 7, 2010 in PCT/EP10/000569 filed Jan. 28, 2010.
(Continued)

*Primary Examiner* — Prem C Singh
*Assistant Examiner* — Brandi M Doyle
(74) *Attorney, Agent, or Firm* — Oblon, McClelland, Maier & Neustadt, L.L.P.

(57) ABSTRACT

Process for the purification of an aqueous stream coming from the Fischer-Tropsch reaction comprising a treatment with at least one inorganic base, an evaporation treatment, a distillation and/or stripping treatment and a treatment with at least one organic base. The process allows at least a part of the aqueous stream coming from the Fischer-Tropsch reaction to be used as process water in the production plant of synthesis gas subsequently sent to a Fischer-Tropsch plant for the production of hydrocarbons.

38 Claims, 1 Drawing Sheet (51) Int. Cl.
   *C02F 1/44* (2006.01)
   *C02F 3/02* (2006.01)
   *C02F 3/28* (2006.01)
   *C02F 101/32* (2006.01)
   *C02F 103/36* (2006.01)

(52) U.S. Cl.
   CPC . *C02F 3/02* (2013.01); *C02F 3/286* (2013.01); *C02F 9/00* (2013.01); *C02F 2101/32* (2013.01); *C02F 2103/36* (2013.01)

(56) References Cited

U.S. PATENT DOCUMENTS 7,989,510 B2  8/2011  Locatelli

2005/0131084 A1  6/2005  Kohler et al.
2005/0131085 A1  6/2005  Kohler et al.

FOREIGN PATENT DOCUMENTS

| JP | 9 122692 | 5/1997 |
| WO | 2006 108195 | 10/2006 |
| WO | 2009 090105 | 7/2009 |

OTHER PUBLICATIONS

U.S. Appl. No. 13/140,586, filed Jun. 17, 2011, Locatelli, et al.
U.S. Appl. No. 13/500,434, filed Apr. 5, 2012, Locatelli, et al.

* cited by examiner

PROCESS FOR THE PURIFICATION OF AN AQUEOUS STREAM COMING FROM THE FISCHER-TROPSCH REACTION

The present invention relates to a process for the purification of an aqueous stream coming from the Fischer-Tropsch reaction.

More specifically, the present invention relates to a process for the purification of an aqueous stream coming from the Fischer-Tropsch reaction which comprises a treatment with at least one inorganic base, an evaporation treatment, a distillation and/or stripping treatment and a treatment with at least one organic base.

The Fischer-Tropsch technology for preparing hydrocarbons from mixtures of gases based on hydrogen and carbon monoxide, conventionally known as synthesis gas, is known in scientific literature. A compendium which summarizes the main works on the Fischer-Tropsch reaction is contained in the Bureau of Mines Bulletin, 544 (1955) entitled "Bibliography of the Fischer-Tropsch Synthesis and Related Processes" H. C. Anderson, J. L. Wiley and A. Newell.

The Fischer-Tropsch technology is generally based on the use of slurry reactors, reactors which are used in chemical reactions that are carried out in multiphase systems in which a gaseous phase is bubbled into a suspension of a solid (solid phase) in a liquid (liquid phase). In the case of Fischer-Tropsch reaction, the gaseous phase comprises synthesis gas or "syngas", which is a combination of hydrogen ($H_2$) and carbon monoxide (CO), with a molar ratio $H_2/CO$ ranging from 1 to 3, preferably of about 2, the liquid phase, at the reaction temperature, prevalently comprises the reaction product, i.e. essentially linear hydrocarbons with a high number of carbon atoms, and the solid phase prevalently comprises the catalyst. The synthesis gas can optionally contain smaller quantities of carbon dioxide ($CO_2$) and/or water. The presence of sulfur, nitrogen, halogens, selenium, phosphorous and arsenic, or their derivatives, in said synthesis gas, is not desirable. For this reason, and depending on the quality of the synthesis gas, it is preferable to remove the sulfur and other contaminants, before feeding said synthesis gas to the Fischer-Tropsch reactor. Methods for removing these contaminants are known in the art. The use of guard beds based on zinc oxide are preferred for the removal of sulfur or its derivatives. Furthermore, it is generally preferable to remove the carbon dioxide ($CO_2$) which is optionally formed from the synthesis gas, as well as the sulfur or its derivatives not yet removed. For this purpose, for example, the synthesis gas can be put in contact with a moderately alkaline solution (e.g., a solution of potassium carbonate) in a packed column.

The synthesis gas preferably comes from steam reforming and/or from the partial oxidation of natural gas, typically methane, or of other heavier hydrocarbons optionally present in natural gas (e.g. ethane, propane, butane), according to processes known in the art.

In a steam reforming process, the desulfurized natural gas is generally mixed with steam and is passed, operating at a high temperature and pressure, through a catalytic bed comprising a catalyst containing a transition metal, preferably nickel. The steam is usually supplied by means of a saturator in which water is put in contact with the above preheated natural gas.

Alternatively, the synthesis gas can derive from other production processes such as, for example, from autothermal reforming or from the process known as C.P.O. (Catalytic Partial Oxidation) which use streams of high-purity oxygen or enriched air together with the desulfurized natural gas and the catalyst, or from the gasification of coal or of other carbonaceous products, with steam at a high temperature as described, for example, in "Catalysis Science and Technology", Vol. 1, Springer-Verlag, New York, 1981.

In the Fischer-Tropsch reaction, the carbon monoxide and hydrogen are converted to water and organic molecules mainly containing carbon and hydrogen (i.e. hydrocarbons). Furthermore, other organic molecules which contain oxygen in addition to carbon and hydrogen, called oxygenated compounds, can be formed during the Fischer-Tropsch reaction.

The Fischer-Tropsch reaction is normally carried out at temperatures equal to or higher than 150° C., for example ranging from 180° C. to 350° C., maintaining a pressure ranging from 0.5 MPa to 10 MPa, preferably ranging from 1 MPa to 5 MPa, inside the reactor.

As mentioned above, the Fischer-Tropsch reaction is facilitated by a catalyst. The catalysts preferably have the function of increasing the reaction rate without being used up during the reaction itself. The type of catalyst influences the relative quantities of hydrocarbons obtained from the Fischer-Tropsch reaction. The catalysts normally used in the Fischer-Tropsch reaction generally contain at least one metal belonging to groups 8, 9, or 10 of the Periodic Table of Elements (in the IUPAC notation dated Jun. 22, 2007).

Catalysts containing cobalt, iron, ruthenium, and/or nickel, can be advantageously used for the conversion of synthesis gas to hydrocarbons suitable for the production of gasoline and/or diesel. Cobalt, for example, is particularly suitable for Fischer-Tropsch catalysts for the production of heavy hydrocarbons from synthesis gas. Iron has the advantage of being easily available and relatively economical but has the disadvantage of increasing the reaction known as "water-gas-shift", which converts a part of the carbon monoxide and water produced into carbon dioxide and hydrogen. Nickel favours the termination reaction and is advantageously used for the selective production of methane from synthesis gas. Ruthenium has the advantage of a high activity but is rather costly.

The Fischer-Tropsch reaction typically produces a mixture of gaseous hydrocarbons, liquid hydrocarbons, and waxes, having a number of carbon atoms varying from 1 to 100 or more, and having different molecular weights. Depending on the molecular weight distribution, these mixtures are suitable for different uses. Mixtures containing liquid hydrocarbons, for example, can be subjected to further treatment in order to obtain gasoline, and also medium distillates. The waxes can be subjected to a further treatment in order to be converted to liquid and/or gaseous hydrocarbons. Consequently, in order to use Fischer-Tropsch reaction for the subsequent production of fuel, it is desirable to increase the production of liquid hydrocarbons and/or waxes, such as hydrocarbons having at least 5 carbon atoms per molecule ($C_{5+}$ hydrocarbons).

In addition to mixtures of hydrocarbons, the Fischer-Tropsch reaction also generates water according to the following equation:

$$n\text{CO} + 2n\text{H}_2 \rightarrow C_nH_{2n}\,n\text{H}_2\text{O}.$$

The production of water is quite significant as a mole of water is produced for each mole of carbon monoxide converted to hydrocarbons. Typically, when non-shifting catalysts are used, for example, cobalt and/or ruthenium, the reaction known as "water-gas-shift" is minimum so that the total production of water is close to that of the stoichiometric reaction. For shifting catalysts, for example, iron, the reaction known as "water-gas-shift" is more significant so that the total production of water is always considerable but lower than that of the stoichiometric reaction.

Before purification, the water coming from the Fischer-Tropsch reaction is generally subjected to preliminary separations, typically through a three-phase separator from which an organic condensate is obtained, together with a vapour phase and an aqueous phase, which still contains organic compounds dissolved and in suspension, and is preferably treated in a coalescence filter.

The water thus separated remains contaminated by hydrocarbon compounds, typically less than 1,000 ppm, and oxygenated compounds, soluble in water. The quantity of contaminants is in relation to the catalyst and reaction conditions, in particular temperature and pressure. The overall quantity of oxygenated compounds increases, with an increase in the reaction temperature, the group of organic acids much more significantly.

The main oxygenated contaminants are light alcohols such as methanol and ethanol, indicatively present in a quantity of 0.5% by weight to 5% by weight. Heavier alcohols (such as propanol, butanol, pentanol, etc.) and other oxygenated compounds, such as aldehydes (for example, acetaldehyde, propionaldehyde, butyraldehyde, etc.), ketones (acetone, methylpropylketone, etc.) and acids (for example, formic acid, acetic acid, propionic acid, butyric acid, isobutyric acid, valeric acid, hexanoic acid, heptanoic acid, octanoic acid, etc.), are also present in lower quantities, the latter indicatively present in concentrations lower than 1.5% by weight.

The quantity of compounds present, within each group, decreases with an increase in the molecular weight, and compounds with up to 25 carbon atoms are included. The water can also contain small quantities of nitrogenous and sulfured compounds deriving from the feedstock used, in addition to traces of metals coming from the reactor. The metals can also be present in the form of suspended solids.

The water coming from the Fischer-Tropsch reaction consequently does not have any commercial value and cannot be disposed of as such due to the organic compounds present in the same which can create various drawbacks. Oxygenated organic compounds (in particular acids), for example, convey corrosive properties, whereas hydrocarbons have the tendency of foaming.

Furthermore, rainwater or other service water present in the production site can be added to the water coming from the Fischer-Tropsch reaction.

A treatment plant of the water coming from the Fischer-Tropsch reaction is therefore necessary for both the re-use of the same within the Fischer-Tropsch process (for example, as process water or cooling water in the reaction section), and also for its disposal outside or for other further uses (for example, as water for irrigation or drinking water).

The treatment or combination of treatments of the water coming from the Fischer-Tropsch reaction is determined by the restrictions imposed by its final use and by the organic compounds present therein.

The treatment plant of the water coming from the Fischer-Tropsch reaction, for example, can be of the biological type, which can be preceded by a treatment, typically distillation and/or stripping to remove the most volatile compounds. The water deriving from the biological treatment is then normally subjected to a further finishing treatment to remove the solids and, if necessary, also the residual salts from the biological treatment. An approach of this type is described, for example, in the U.S. Pat. No. 7,166,219, U.S. Pat. No. 7,150,831, or in International Patent Application WO 2005/113426.

Alternatively, the water coming from the Fischer-Tropsch reaction can be subjected to a treatment of the physico-chemical type. The U.S. Pat. No. 6,462,097, for example, describes a process in which the stripping treatment is followed by an adsorption step on activated carbons. The aqueous stream coming from this adsorption step on activated carbons, rich in organic compounds, can then be sent back to the reaction reactor. Similar suggestions are also provided, for example, in U.S. Pat. No. 6,225,358, U.S. Pat. No. 5,053,581, U.S. Pat. No. 5,004,862, in which the organic compounds, for example $C_1$ to $C_6$ alcohols, present in the water coming from the Fischer-Tropsch reaction, are potentially brought back and then upgraded to simple molecules such as $CO_x/H_2$ (synthesis gas).

Other types of treatment, of the physico-chemical type, allow one or more aqueous streams enriched in organic compounds to be separated.

The United States Patent Application US 2004/0262199, for example, describes the possibility of separating, by distillation, a prevalently alcohol stream with a content of non-acid compounds (NAC) ranging from 55% by weight to a maximum of 85% by weight. This stream can be used as fuel or alternatively it can be further processed to recover the valuable products.

The formation, by treatment of the physico-chemical type, of one or more streams enriched in various groups of organic compounds, contemporaneously with the production of water purified to the required degree, is described, for example, in U.S. Pat. No. 7,153,432 which proposes a process with at least two steps, the first a distillation step and the second a separation step with membranes, and optionally, if necessary, other accessory steps for bringing the purified water to the required degree of purity.

U.S. Pat. No. 7,153,432, in particular, describes a purification process of the water co-produced in the Fischer-Tropsch reaction which comprises: (a) subjecting the water co-produced in the Fischer-Tropsch reaction to distillation or liquid-liquid extraction in order to remove at least a part of the alcohols present in said water and produce a first stream enriched in water; and (b) subjecting said first stream enriched in water to a separation process with membranes which allows at least some of the solids in suspension to be removed together with some organic acids in order to obtain purified water. This separation process with membranes can be selected from the group comprising: micro-filtration, ultra-filtration, reverse osmosis, pervaporation.

Further uses of the water coming from the Fischer-Tropsch reaction are known in the art.

International patent application WO 2005/113426, for example, describes a method for the use of the water coming from the Fischer-Tropsch reaction carried out at a low temperature, which includes the phase of feeding the water coming from said reaction to a saturator contained in the production unit of synthesis gas in order to saturate the stream of gaseous hydrocarbons fed to said unit.

U.S. Pat. No. 7,323,497 describes a process for the synthesis of hydrocarbons comprising: (a) subjecting a mixture of hydrocarbons and steam to a catalytic steam reforming process in order to obtain a partially reformed gas; (b) subjecting the partially reformed gas to a partial oxidation with a gas containing oxygen and bringing the resulting gas towards equilibrium by means of a steam reforming catalyst in order to obtain a mixture of reformed synthesis gas; (c) cooling the mixture of reformed synthesis gas to below the dew point of the steam in order to condense the water and separating the condensed water in order to obtain a water-free synthesis gas; (d) synthesizing the hydrocarbons from said water-free synthesis gas by means of the Fischer-Tropsch reaction; and (e) separating the hydrocarbons from the water co-produced; characterized in that at least a part of said co-produced water is fed to a saturator in which it comes into contact with a feedstock of hydrocarbons thus forming a mixture of hydrocarbons and steam to be subjected to a catalytic steam reforming.

The Applicant has observed, however, that the feeding the water coming from the Fischer-Tropsch reaction directly to the saturator can cause some problems. The organic compounds present in this water, for example, in addition to the problems indicated above (i.e. problems of corrosion of the plant and/or foaming), can cause, in particular acids, a poisoning of the catalysts used in the steam reforming process.

The Applicant considered the problem of finding a process that allows at least a part of the aqueous stream coming from the Fischer-Tropsch reaction to be used as process water in the production plant of synthesis gas subsequently sent to the Fischer-Tropsch plant for the production of hydrocarbons.

It has now been found that by subjecting the aqueous stream deriving from the Fischer-Tropsch reaction to a purification process which comprises treatment with at least one inorganic base, an evaporation treatment, a distillation and/or stripping treatment, and treatment with at least one organic base, it is possible to overcome the drawbacks described above and use at least a part of said aqueous stream in the production plant of synthesis gas subsequently sent to the Fischer-Tropsch plant for the production of hydrocarbons. In particular, said aqueous stream can be used in the production of synthesis gas as a steam source and, thanks to the presence of oxygenated organic compounds, in particular alcohols, as hydrogen and carbon source, thus increasing the production of said synthesis gas.

It has been found, in particular, that by adding at least one inorganic base to the aqueous stream coming from the Fischer-Tropsch reaction and subsequently sending said aqueous stream to an evaporator, the organic acids can be concentrated, in particular in the form of salts deriving from the reaction of said organic acids with said inorganic base, obtaining an aqueous stream enriched in said salts coming out from the bottom of said evaporator, thus reducing both the quantity of organic acids in the aqueous stream coming out from the head of the evaporator which is subsequently sent to a saturator, and also the quantity of water which is then sent to a distillation and/or stripping column. In particular, the aqueous stream coming out from the bottom of said evaporator is subsequently sent to a distillation and/or stripping column obtaining a stream coming out from the bottom of said column further enriched in said salts which can be subjected to further purification treatment depending on the degree of purity desired. Furthermore, the treatment with said at least one inorganic base allows to minimize the quantity of organic base to be used in order to reduce or even to eliminate the organic acids non-reacted with said at least one inorganic base present in the aqueous stream coming out from the head of said distillation and/or stripping column before sending it to a saturator and subsequently to a production plant of synthesis gas, thus avoiding both problems of plant corrosion due to the presence of said organic acids, and also the poisoning of the catalysts normally used in the production of the synthesis gas.

According to a first aspect, the present invention therefore relates to a process for the purification of an aqueous stream (i) coming from the Fischer-Tropsch reaction which comprises:
  adding to said aqueous stream at least one inorganic base having a $pK_a$, measured at 25° C. in water, higher than or equal to 6.5, preferably higher than or equal to 7, and feeding it to an evaporator obtaining two output streams:
    a vapour stream (ii) coming out from the head of the evaporator which, after condensation, forms an aqueous stream (iia) comprising alcohols having from 1 to 20 carbon atoms, preferably from 1 to 8 carbon atoms, and other optional volatile compounds;
    an aqueous stream (iii) coming out from the bottom of the evaporator comprising alcohols having from 1 to 20 carbon atoms, preferably from 1 to 8 carbon atoms, and organic acids, said aqueous stream (iii) being enriched with salts of organic acids, said salts deriving from the reaction of said at least one inorganic base with the organic acids present in said aqueous stream (i);
  feeding said aqueous stream (iii) to a distillation column obtaining two output streams:
    an aqueous stream (iv) coming out from the head of the column comprising alcohols having from 1 to 20 carbon atoms, preferably from 1 to 8 carbon atoms, organic acids having from 1 to 8 carbon atoms, preferably from 2 to 4 carbon atoms, said organic acids being present in a quantity lower than or equal to 2% by weight, preferably ranging from 0.01% by weight to 1.2% by weight, with respect to the total weight of said aqueous stream (iv) and other optional volatile compounds;
    an aqueous stream (v) coming out from the bottom of the distillation column further enriched in salts of organic acids present in said aqueous stream (iii);
  adding to said aqueous stream (iv) at least one organic base having a $pK_a$, measured at 25° C. in water, higher than or equal to 7, preferably between 8 and 12;
  combining said aqueous stream (iv), after addition with said at least one organic base, with said aqueous stream (iia), obtaining an aqueous stream (vi) and feeding it to a saturator;
  feeding the process gas to said saturator thereby obtaining a gaseous stream (vii) coming out from the head of the saturator;
  feeding said gaseous stream (vii) to the synthesis gas production plant.

According to a preferred embodiment of the present invention, said gaseous stream (vii) is fed to catalytic steam reforming.

For the purposes of the present invention and of the following claims, the definitions of the numerical ranges always comprise the extremes unless otherwise specified.

The Fischer-Tropsch reaction can be advantageously carried out as described in U.S. Pat. No. 6,348,510 whose content is considered incorporated herein as reference.

The aqueous stream (iia) has a concentration of alcohols preferably higher than or equal to 1% by weight, more preferably ranging from 2% by weight to 5% by weight, with respect to the total weight of said aqueous stream (iia). Said aqueous stream (iia) can also comprise traces of organic acids which have not reacted with said inorganic base, and/or traces of non-reacted inorganic base.

The aqueous stream (iii) has a concentration of salts of organic acids preferably higher than or equal to 0.05% by weight, more preferably ranging from 0.2% by weight to 10% by weight, with respect to the total weight of said aqueous stream (iii). Said aqueous stream (iii) can also comprise traces of non-reacted inorganic base, and/or traces of other optional volatile compounds.

The aqueous stream (iv) has a concentration of alcohols preferably higher than or equal to 0.5% by weight, more preferably ranging from 1% by weight to 10% by weight, with respect to the total weight of said aqueous stream (iv).

Said aqueous stream (v) preferably comprises a quantity of salts of organic acids higher than or equal to 80% by weight, more preferably ranging from 90% by weight to 99.9% by weight, with respect to the total weight of the salts of organic acids present in the aqueous stream (iii) fed to the distillation column.

For the purposes of the present invention and of the following claims, the term "volatile compounds", optionally present in said aqueous streams (iia), (iii) and (iv), refers to compounds such as, for example, hydrocarbons, aldehydes, ketones, or mixtures thereof.

According to a further preferred embodiment of the present invention, said inorganic base can be selected, for example, from hydroxides and/or oxides, of alkaline and/or alkaline earth metals belonging to groups 1 and 2 of the Periodic Table of Elements (in the IUPAC notation dated Jun. 22, 2007).

According to a preferred embodiment of the present invention, said inorganic base can be selected from sodium hydroxide, potassium hydroxide, calcium hydroxide, magnesium hydroxide, lithium hydroxide, or mixtures thereof. Sodium hydroxide, potassium hydroxide, or mixtures thereof, are preferred.

It should be noted that for the purposes of the present invention the $pK_a$ of said inorganic base is preferably higher than the $pK_a$ of the organic base.

According to a preferred embodiment of the present invention, said inorganic base can be added to the aqueous stream (i) in such a quantity that the organic acid/inorganic base equivalent molar ratio ranges from 0.70 to 1.50, preferably from 0.90 to 1.20.

According to a preferred embodiment of the present invention, said inorganic base can be added to the aqueous stream (i) in such a quantity that the pH of the aqueous stream (iii) coming out from the bottom of the evaporator is higher than or equal to 6.5, preferably ranging from 7 to 11.

According to a preferred embodiment of the present invention, said inorganic base can be used in the form of an aqueous solution.

It should be noted that for the purposes of the present invention, said inorganic base can be added in other points of the process. For example, said inorganic base can be added to the evaporator.

As already specified above, the separation of said vapour stream (ii), which after condensation becomes the aqueous stream (iia), and said aqueous stream (iii) takes place in the evaporator.

Any type of evaporator known in the art can be advantageously used for the purposes of the present invention. Specific examples of evaporators which can be advantageously used are: natural circulation evaporators in which the evaporation is caused by movements induced by boiling alone, evaporators in which the evaporation is caused by means of forced circulation in which the speed and the turbulence are increased with the use of a circulation pump (Forced-circulation Evaporators), evaporators of the ME-EV type (Multi Effect Evaporators), single phase or multiphase evaporators, single effect evaporators, evaporators of the STV type (Short Tube Vertical Evaporators), evaporators of the LTV type (Long Tube Vertical Evaporators), basket type evaporators, horizontal tube evaporators, falling film evaporators, wiped film evaporators, and the like.

More details relating to the types of evaporators used can be found, for example, in "Process Heat Transfer", Donald Q. Kern, McGraw-Hill (1950), Chapter 14, Evaporator, pg. 375-510; Perry's Chemical Engineers' Handbook, McGraw-Hill ($7^{th}$ Ed.-1997), Section 11, pg. 108-118.

The evaporator preferably operates at a temperature ranging from 90° C. to 160° C. and at a pressure ranging from 0.5 ata (atmosphere absolute) to 4 ata (atmosphere absolute).

The incondensable compounds present in the aqueous stream coming from the Fischer-Tropsch reaction can also be eliminated in said evaporator.

For the purposes of the present invention and of the following claims, the term "incondensable compounds" refers to traces of synthesis gas (e.g., hydrogen and/or carbon monoxide) optionally present in the aqueous stream coming from the Fischer-Tropsch reaction fed to the head of the column.

Alternatively, said distillation column can be a stripping column.

Alternatively, said distillation column can be a distillation and stripping column.

The distillation and/or stripping column consists of a condenser at the head, a reboiler at the bottom, enrichment stages situated above the feeding and exhaustion stages situated below the feeding. Said enrichment and exhaustion stages can be obtained with plates for distillation and/or stripping columns, or with internals of the structured or non-structured type.

For the purposes of the present invention, distillation and/or stripping columns having a configuration of the asymmetric type can be used, i.e. having a number of plates forming the theoretical enrichment stages equal to about half of the number of plates forming the theoretical exhaustion stages. Alternatively, distillation and/or stripping columns without plates forming the theoretical enrichment stages can be used.

For the purposes of the present invention and of the following claims, the term "aqueous stream" (iv) coming out from the head of the column" refers to the stream coming out from the condenser at the head forming part of said column. Said condenser is preferably a total condenser.

For the purposes of the present invention and of the following claims, the term "aqueous stream" (v) coming out from the bottom of the column" refers to the stream coming out from the reboiler at the bottom forming part of said column.

The distillation and/or stripping column preferably operates at atmospheric pressure even if said column is capable of functioning equally well at pressures higher or lower than atmospheric pressure such as, for example, pressures ranging from 0.5 ata (atmosphere absolute) to 4 ata (atmosphere absolute).

The temperatures are generally determined by the pressure and the composition of the aqueous stream coming from the Fischer-Tropsch reaction. In general, at operating pressures ranging from 0.5 ata (atmosphere absolute) to 4 ata (atmosphere absolute), the temperature at the head of the column is maintained within the range of from 70° C. to 125° C., that at the bottom within the range of from 90° C. to 160° C.

If the incondensable compounds are not completely eliminated during the evaporation, in addition to the formation of the above aqueous streams (iv) and (v), said incondensable can also be eliminated in said distillation and/or stripping column.

As specified above, the saturator generally has the function of providing the vapour necessary for saturating the process gas, preferably natural gas, usually methane, before feeding this to the synthesis gas production plant. In the saturator, the water is generally put in contact with the above preheated process gas. For the purposes of the present invention, the saturator can operate either in countercurrent or in cocurrent, with or without external recirculation.

Any type of saturator known in the art can be advantageously used for the purposes of the present invention. Specific examples of saturators which can be advantageously used are: saturators of the vertical tube type, saturators of the spray tower type, saturators of the baffle tower type, saturators of the perforated plate tower type, saturators of the packed tower type, saturators of the wetted wall tower type, and the like.

Operating according to the process of the present invention, said gaseous stream (vii) comes out from the head of the saturator, whereas a drain stream (viii) comprising salts of the organic acids present in said aqueous stream (iv), said salts deriving from the reaction of the organic acids present in said aqueous stream (iv) with the organic base added thereto, comes out from the bottom of the saturator. Said drain stream (viii) can be discharged and fed to the evaporator.

According to the process of the present invention, said drain stream (viii) is preferably fed to the evaporator, after being combined with the aqueous stream (i) coming from the Fischer-Tropsch reaction.

The saturator preferably operates at a temperature ranging from 160° C. to 200° C. and at a pressure ranging from 30 bara (absolute bar) to 60 bara (absolute bar).

Before being fed to the distillation and/or stripping column, the aqueous stream (i) coming from the Fischer-Tropsch reaction can be advantageously subjected to filtration, for example with the use of coalescence filters, or of separators capable of separating the hydrophilic compounds from the lipophilic compounds, in order to maximize the elimination of undesired organic compounds, in particular hydrocarbons, present in said aqueous phase, which could cause the formation of foams in the downstream equipments.

The formation of foams can also be avoided by the addition of a suitable antifoam agent selected, for example, from those commercially known (e.g. anionic surfactants, silicone surfactants, polyethylene glycols, or mixtures thereof).

According to a preferred embodiment of the present invention, said organic base has a boiling point ranging from 70° C. to 200° C., preferably from 90° C. to 150° C.

According to a preferred embodiment of the present invention, said organic base has a vapour pressure, at 20° C., ranging from 0.01 kPa to 10 KPa, preferably ranging from 0.02 kPa to 3 kPa.

According to a further preferred embodiment of the present invention, said organic base can be selected from: morpholine, piperazine, pyrrolidine, piperidine, pyrazolidine, 2,6-dimethylmorpholine, cyclohexylamine, diethylamino-ethanol, 2-amino-2-methyl-1-propanol, or mixtures thereof. Morpholine is preferred.

According to a preferred embodiment of the present invention, said organic base can be added to the aqueous stream (iv) in such a quantity that the organic acid/organic base equivalent molar ratio ranges from 0.01 to 0.3, preferably from 0.05 to 0.2.

According to a preferred embodiment of the present invention, said organic base can be added to the aqueous stream (iv) in such a quantity that the pH of said aqueous stream (iv) is higher than or equal to 6.5, preferably ranging from 7 to 11.

According to a preferred embodiment of the present invention, said organic base can be used in the form of an aqueous solution.

It should be noted that for the purposes of the present invention, said organic base can be added in other points of the process. For example, said organic base can be added to the aqueous stream (iia) coming out from the head of the evaporator.

It should also be noted that the process object of the present invention allows at least part of the organic base to be recovered.

For the above purpose, as specified above, the drain stream (viii) coming out from the bottom of the saturator, said drain stream (viii) comprising salts deriving from the reaction of the organic acids present in the aqueous stream (iv) with said organic base and, optionally, traces of non-reacted organic acids and/or organic base, can be combined with the aqueous stream (i) and fed to the evaporator.

In the evaporator, the salts present in said drain stream (viii) can react with the strong inorganic base, releasing the organic base coming out from the head of the evaporator with the vapour stream (ii). As mentioned above, said vapour stream (ii), after condensation, forms an aqueous stream (iia) which is joined with the aqueous stream (iv) obtaining an aqueous stream (vi) which is fed to the saturator, in this way, allowing the organic base to be re-used.

Said organic base is preferably recovered with a yield higher than or equal to 50%, said yield being calculated with respect to the total quantity of the organic base used at the beginning of the process. The recovery of said organic base allows the addition of said organic base to said aqueous stream (iv) to be minimized or even avoided.

The aqueous stream (iia) has a concentration of water preferably higher than or equal to 90% by weight, more preferably higher than or equal to 95% by weight, with respect to the total weight of said aqueous stream (iia). Said aqueous stream (iia) can also comprise traces of organic acids which have not reacted with the inorganic base, and/or traces of unreacted inorganic base.

Said aqueous stream (v) has a concentration of salts of organic acids preferably higher than or equal to 0.05% by weight, more preferably ranging from 0.1% by weight to 5% by weight, with respect to the total weight of said aqueous stream (v).

Depending on the final use and, consequently, on the degree of purity to be obtained, said aqueous stream (v) can be subjected to further purification treatments such as, for example: ion exchange resins, reverse osmosis, crystallization, electrodialysis, biological treatment.

In particular, said aqueous stream (v), having a pH preferably higher than or equal to 6.5, preferably ranging from 7 to 11, and a C.O.D. preferably ranging from 500 mg/l to 12,000 mg/l, can be advantageously subjected to biological treatments of both the aerobic and anaerobic type.

When the C.O.D. is higher than 12,000 mg/l, said aqueous stream (v) can be advantageously subjected to reverse osmosis treatment.

BRIEF DESCRIPTION OF THE FIGURE

The present invention will now be illustrated in higher detail through an embodiment with reference to FIG. 1 provided below.

Figure 1:
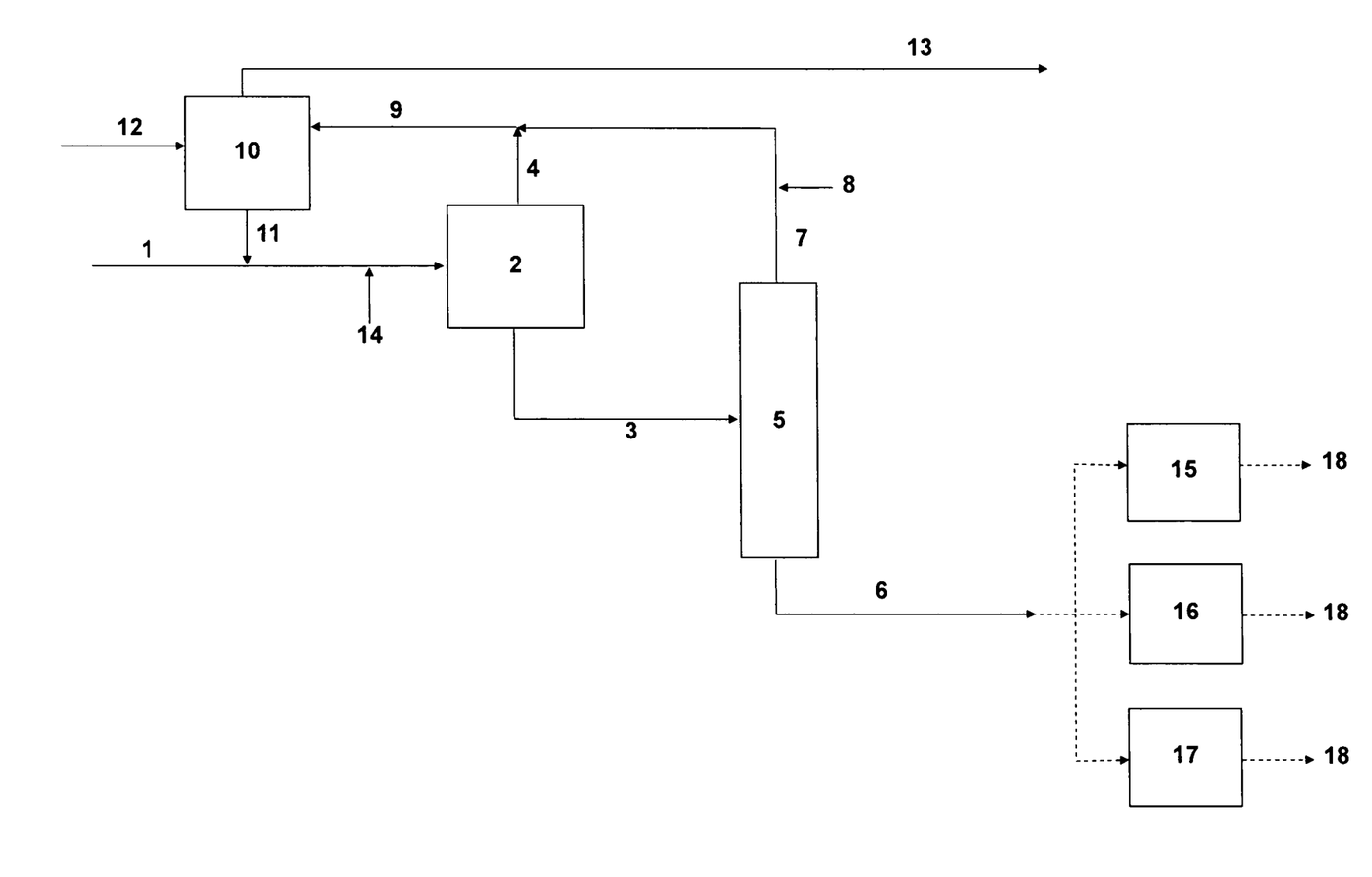

The process of the present invention can be carried out as represented, for example, in FIG. 1.

In this case, an inorganic base (e.g., sodium hydroxide) (14) is added to the aqueous stream (1) coming from the Fischer-Tropsch reaction, to which an antifoam agent has been added, in order to neutralize said aqueous stream (1) which generally has a pH lower than 4. The pH of the aqueous stream (1), as also the pH of the various streams, is measured with pH meters known in the art, not represented in FIG. 1.

After the addition of the inorganic base, said aqueous stream (1) is fed to the evaporator (2) which, in this specific case, also comprises a condenser (not represented in FIG. 1). The organic acids present in the aqueous stream (1), after reaction with the inorganic base (14), are in the form of salts and are eliminated through the aqueous stream (3) coming out from the bottom of the evaporator (2).

Said inorganic base (14), in addition to reacting with the organic acids present in the aqueous stream (1), is also capable of reacting with the salts of the organic acids contained in the drain stream (11) [said salts deriving from the reaction of the organic base with the organic acids present in the aqueous stream (7)] releasing the organic base (8) and forming salts of the inorganic base (14). The organic base (8) released, passes into the aqueous stream (4) coming out from the head of the evaporator (2), in this way allowing the organic base (8) to be re-used in the process, object of the present invention. Optional traces of said non-reacted organic base (8), and/or of salts of organic acids with said organic base, can remain in the evaporator and can be eliminated through the aqueous stream (3) coming out from the bottom of the evaporator (2).

Said aqueous stream (4) is combined with the aqueous stream (7) obtaining the aqueous stream (9) which is sent to the saturator (10). The combination of said aqueous stream (4) and of said aqueous stream (7) not only allows the recovery of the organic base (8), but also allows the recovery of the organic carbon deriving from the Fischer-Tropsch reaction [in particular, the alcohols contained in the aqueous stream (4) and in the aqueous stream (7)], enabling it to be re-used for the production of synthesis gas.

The aqueous stream (3) is fed to the distillation column (5). Said distillation column (5) preferably comprises a number of plates forming the enrichment stages situated above the feeding higher than 2, typically ranging from 3 to 15, and a number of plates forming the exhaustion stages situated below the feeding higher than 5, typically ranging from 6 to 30, more preferably ranging from 8 to 14. Said distillation column (5) preferably comprises a number of plates forming the theoretical fractional distillation (or enrichment) stages equal to 6 and a number of plates forming the theoretical exhaustion stages equal to 12. The column (5) also comprises a condenser at the head (not represented in FIG. 1) and a reboiler at the bottom (not represented in FIG. 1).

As indicated above, the enrichment and exhaustion stages can be effected with plates for distillation columns or with internals of the structured or non-structured type.

An aqueous stream (7) comprising alcohols and organic acids, said organic acids being in a quantity lower than or equal to 2% by weight, preferably ranging from 0.01% by weight to 1.2% by weight, with respect to the total weight of said aqueous stream (7), and optional other volatile compounds, comes out from the head of the distillation column (5).

An organic base (e.g. morpholine) (8) is added to said aqueous stream (7) in order to neutralize it.

As already specified above, after the addition of said organic base (8), the aqueous stream (7) is joined with said aqueous stream (4) forming the aqueous stream (9) which is fed to the saturator (10) to which the process gas (12) (e.g., natural gas) is also fed.

After reaction with the organic base (8), the organic acids present in the aqueous stream (7) are in the form of salts which are essentially recycled to the process object of the present invention by means of the drain stream (11) coming out from the bottom of the saturator (10). The optional traces of non-reacted organic acids and/or organic base (8) are also essentially recycled to the process by means of the drain stream (11) coming out from the bottom of the saturator (10).

A gaseous stream (13) then comes out from the head of the saturator (10), which is fed to the production plant of synthesis gas, in particular to the steam reforming section (not represented in FIG. 1).

As represented in FIG. 1, said drain stream (11) is joined with said aqueous stream (1) coming from the Fischer-Tropsch reaction and sent to the evaporator (2), thus allowing the recovery of the organic base (8).

Depending on the required final use, the aqueous stream (6) can in fact be fed:
   to an anaerobic biological treatment (15);
   to an aerobic biological treatment (16);
   to an reverse osmosis treatment (17);
in order to obtain purified water (18).

As represented in FIG. 1, only one evaporator (2) is present. Before sending the aqueous stream (1) to the distillation column (5), however, further passages can be carried out in one or more evaporators situated in series or in parallel (not represented in FIG. 1).

Some illustrative and non-limiting examples are provided for a better understanding of the present invention and for its embodiment.

EXAMPLE 1

After having carried out the Fischer-Tropsch reaction as described in U.S. Pat. No. 6,348,510 (IFP-ENI) and with reference to FIG. 1, the water which is separated by decanting from the reaction effluent [aqueous stream (1)], to which a quantity of an aqueous solution at 50% of sodium hydroxide equal to 980 Kg/h was added, was sent to the evaporator (2) [of the Type ME-EV (Multi-Effect Evaporator)] at a nominal flow-rate equal to 361 t/h. The quantity of sodium hydroxide is such as to bring the pH at the inlet of the evaporator to a value of about 9.

Furthermore, 2 ppm of antifoam agent polypropylene glycol having an average molecular weight of 2,000, were added to the aqueous stream (1).

An aqueous stream (3) enriched in salts of the organic acids present in the aqueous stream (1), was obtained at the outlet of the evaporator bottom (2). Said aqueous stream (3), coming out at a nominal flow-rate equal to 235 t/h, was sent to the distillation column (5).

A stream of vapour was obtained at the outlet of the head of the evaporator (2), which was sent, at a nominal flow-rate equal to 126 t/h, to a condenser (not represented in FIG. 1), from which the aqueous stream (4) comes out.

The distillation column (5) has 6 enrichment stages and 12 exhaustion stages, a total condenser at the head and a reboiler at the bottom, and operates at a nominal flow-rate of 235 t/h.

The distillation column (5), operating at atmospheric pressure and at a temperature ranging from 90° C. (temperature at the head) to 105° C. (temperature at the bottom), was managed so as to have an aqueous stream coming out from the head of the distillation column [aqueous stream (7)] equal to 15 t/h which, after suitable pumping, was sent to the saturator (10).

The aqueous stream (7) proved to have the following composition, obtained by means of gas chromatography:
   alcohols: 59% by weight with respect to the total weight of said aqueous stream (7);
   organic acids: <0.1% by weight with respect to the total weight of said aqueous stream (7).

A quantity of morpholine in excess was added to the aqueous stream (7), equal to 0.05 kmol/h (organic acids/inorganic base equivalent molar ratio equal to 0.1), so as to neutralize the organic acids present in said aqueous stream (7).

The aqueous stream (6) coming out from the reboiler at the bottom of the distillation column (5) comprising salts of the acids present in the aqueous stream (3), proved to have the following composition, obtained by means of gas chromatography:

salts of the acids: 99.9% by weight with respect to the total weight of the acids present in the aqueous stream (3).

After suitable cooling, said aqueous stream (6) can be sent to the subsequent purification treatments.

Said aqueous stream (7) having a nominal flow-rate equal to 15 t/h, before being sent to the saturator, is joined with the aqueous stream (4) having a nominal flow-rate equal to 126 t/h After being joined to form the aqueous stream (9), the aqueous stream (4) and the aqueous stream (7), were sent to the saturator (10) at a nominal flow-rate equal to 141 t/h, the pH of the aqueous stream (9) proved to be equal to 9.

The saturator (10) is a vertical tube saturator equipped with a vapour heating system and an external recirculation circuit equipped with a gas/liquid separator, operating at a pressure of 40 bar and 180° C., in equicurrent with the flow of natural gas to be saturated. Natural gas was then sent to the saturator (10), in countercurrent, at a nominal flow-rate equal to 450,000 Nm$^3$/h. A drain stream (11) was obtained at the outlet of the saturator (10) at a nominal flow-rate equal to 10 t/h.

Said drain stream (11), comprising salts deriving from the reaction of the organic acids present in the aqueous stream (7) with morpholine, was joined with the aqueous stream (1) and sent to the evaporator (2).

A saturated gaseous stream (13) having a nominal flow-rate equal to 600,000 Nm$^3$/h, was obtained at the outlet of the head of the saturator (10), which was sent to the production plant of synthesis gas.

The invention claimed is:

1. A process for purifying an aqueous stream (i) coming from a Fischer-Tropsch reaction containing organic acid(s) comprising:
    adding at least one inorganic base to the aqueous stream (i),
    feeding the aqueous stream (i) after addition of the at least one inorganic base to an evaporator and obtaining a vapor stream (ii) and an aqueous stream (iii):
        wherein the vapor stream (ii) exits a head of the evaporator and comprises alcohols having from 1 to 20 carbon atoms and optionally other volatile compounds and is subsequently condensed thus forming an aqueous stream (iia);
        wherein the aqueous stream (iii) exits a bottom of the evaporator and comprises alcohols having from 1 to 20 carbon atoms, organic acids, and salts of organic acids that are formed upon the addition of the at least one inorganic base to the aqueous stream (i) and is subsequently fed to a distillation column;
    separating aqueous stream (iii) in the distillation column into an aqueous stream (iv) which emerges from a head of the distillation column and an aqueous stream (v) which emerges from a bottom of the distillation column:
        wherein the aqueous stream (iv) exiting from the head of the distillation column comprises alcohols having from 1 to 20 carbon atoms and comprises less than or equal to 2% by weight of organic acids having from 1 to 8 carbon atoms with respect to the total weight of the aqueous stream (iv), and optionally comprises other volatile compound(s), and
        wherein the aqueous stream (v) exiting from the bottom of the distillation column comprises a portion of the salts of organic acids present in said aqueous stream (iii);
    adding to the aqueous stream (iv) exiting from the head of the distillation column at least one organic base having a pKa, measured at 25° C. in water, greater than or equal to 7; and combining the aqueous stream (iv), after addition with the at least one organic base, with the aqueous stream (iia) to obtain an aqueous stream (vi); routing the aqueous stream (vi) and a process gas to a saturator and producing a gaseous stream (vii) from a head of the saturator; and feeding the gaseous stream (vii) from the saturator to a synthesis gas production plant; and, optionally, routing a drain stream (viii) from a bottom of the saturator into aqueous stream (i); and, optionally, routing the aqueous stream (v) exiting from the bottom of the distillation column to further treatment in order to obtain purified water.

2. The process according to claim 1, wherein said inorganic base has a pK$_a$, measured at 25° C. in water, greater than or equal to 6.5.

3. The process according to claim 1, wherein said aqueous stream (iv) comprises organic acids in an amount of from 0.01% by weight to 1.2% by weight with respect to the total weight of said aqueous stream (iv).

4. The process according to claim 1, wherein said organic base has a pK$_a$, measured at 25° C. in water, ranging from 7 to 12.

5. The process according to claim 1, wherein said gaseous stream (vii) that is fed to the synthesis gas production plant undergoes catalytic steam reforming.

6. The process according to claim 1, wherein said aqueous stream (iia) has a concentration of alcohols greater than or equal to 1% by weight with respect to the total weight of said aqueous stream (iia).

7. The process according to claim 6, wherein said aqueous stream (iia) has a concentration of alcohols ranging from 2% by weight to 5% by weight with respect to the total weight of said aqueous stream (iia).

8. The process according to claim 1, wherein said aqueous stream (iii) has a concentration of salts of organic acids greater than or equal to 0.05% by weight with respect to the total weight of said aqueous stream (iii).

9. The process according to claim 8, wherein said aqueous stream (iii) has a concentration of salts of organic acids ranging from 0.2% by weight to 10% by weight with respect to the total weight of said aqueous stream (iii).

10. The process according to claim 1, wherein said aqueous stream (iv) has a concentration of alcohols greater than or equal to 0.5% by weight with respect to the total weight of said aqueous stream (iv).

11. The process according to claim 10, wherein said aqueous stream (iv) has a concentration of alcohols ranging from 1% by weight to 10% by weight with respect to the total weight of said aqueous stream (iv).

12. The process according to claim 1, wherein said aqueous stream (v) comprises a quantity of salts of organic acids greater than or equal to 80% by weight with respect to the total weight of the salts of organic acids present in the aqueous stream (iii) fed to the distillation column.

13. The process according to claim 12, wherein said aqueous stream (v) comprises a quantity of salts of organic acids ranging from 90% by weight to 99.9% by weight with respect to the total weight of the salts of organic acids present in the aqueous stream (iii) fed to the distillation column.

14. The process according to claim 1, wherein said inorganic base is selected from at least one of an alkali metal hydroxide, an alkali metal oxide, an alkaline earth metal hydroxide and an alkaline earth metal oxide; or mixtures thereof.

15. The process according to claim 14, wherein said inorganic base is selected from sodium hydroxide, potassium hydroxide, calcium hydroxide, magnesium hydroxide, lithium hydroxide, or mixtures thereof.

16. The process according to claim 15, wherein said inorganic base is selected from sodium hydroxide, potassium hydroxide, or mixtures thereof.

17. The process according to claim 1, wherein adding at least one inorganic base to the aqueous stream (i) comprises adding 0.70 to 1.50 molar equivalents of the at least one inorganic base in proportion to the organic acid content of aqueous stream (i).

18. The process according to claim 17, wherein adding at least one inorganic base to the aqueous stream (i) comprises adding 0.90 to 1.20 molar equivalents of the at least one inorganic base in proportion to the organic acid content of aqueous stream (i).

19. The process according to claim 1, wherein said inorganic base is added to the aqueous stream (i) in a quantity such that the pH of the aqueous stream (iii) coming out from the bottom of the evaporator is greater than or equal to 6.5.

20. The process according to claim 19, wherein said inorganic base is added to the aqueous stream (i) in a quantity such that the pH of the aqueous stream (iii) coming out from the bottom of the evaporator is ranging from 7 to 11.

21. The process according to claim 1, wherein said evaporator operates at a temperature ranging from 90° C. to 160° C. and at a pressure ranging from 0.5 ata (atmospheres absolute) to 4 ata (atmospheres absolute).

22. The process according to claim 1, further comprising releasing salts of organic acids from a bottom of the saturator as a drain stream (viii).

23. The process according to claim 22, wherein said drain stream (viii) is fed to the distillation column, after having been combined with the aqueous stream (i) coming from the Fischer-Tropsch reaction.

24. The process according to claim 1, wherein said saturator operates at a temperature ranging from 160° C. to 200° C. and at a pressure ranging from 30 bara (bar absolute) to 60 bara (bar absolute).

25. The process according to claim 1, wherein said organic base has a boiling point ranging from 70° C. to 200° C.

26. The process according to claim 25, wherein said organic base has a boiling point ranging from 90° C. to 150° C.

27. The process according to claim 1, wherein said organic base has a vapour pressure at 20° C. ranging from 0.01 kPa to 10 kPa.

28. The process according to claim 27, wherein said organic base has a vapour pressure at 20° C. ranging from 0.02 kPa to 3 kPa.

29. The process according to claim 1, wherein said organic base is selected from: morpholine, piperazine, pyrrolidine, piperidine, pyrazolidine, 2,6-dimethylmorpholine, cyclohexylamine, diethylamine ethanol, and 2-amino-2-methyl-1-propanol; or mixtures thereof.

30. The process according to claim 29, wherein said organic base is morpholine.

31. The process according to claim 1, wherein said organic base is added to the aqueous stream (iv) in a quantity such that the organic acid/organic base equivalent molar ratio is ranging from 0.01 to 0.3.

32. The process according to claim 31, wherein said organic base is added to the aqueous stream (iv) in a quantity such that the organic acid/organic base equivalent molar ratio is ranging from 0.05 to 0.2.

33. The process according to claim 1, wherein said organic base is added to the aqueous stream (iv) in a quantity such that the pH of said aqueous stream (iv) is greater than or equal to 6.5.

34. The process according to claim 33, wherein said organic base is added to the aqueous stream (iv) in a quantity such that the pH of said aqueous stream (v) is ranging from 7 to 11.

35. The process according to claim 1, wherein said aqueous stream (iia) has a water concentration greater than or equal to 90% by weight with respect to the total weight of said aqueous stream (iia).

36. The process according to claim 35, wherein said aqueous stream (iia) has a water concentration greater than or equal to 95% by weight with respect to the total weight of said aqueous stream (iia).

37. The process according to claim 1, wherein said aqueous stream (v) has a concentration of salts of organic acids greater than or equal to 0.05% by weight with respect to the total weight of said aqueous stream (v).

38. The process according to claim 37, wherein said aqueous stream (v) has a concentration of salts of organic acids ranging from 0.1% by weight to 5% by weight with respect to the total weight of said aqueous stream (v).

* * * * *